United States Patent [19]

Niwa

[11] Patent Number: 4,628,761
[45] Date of Patent: Dec. 16, 1986

[54] STEERING WHEEL
[75] Inventor: Minoru Niwa, Ichinomiya, Japan
[73] Assignee: Toyoda Gosei Co., Ltd., Aichi, Japan
[21] Appl. No.: 743,354
[22] Filed: Jun. 10, 1985
[30] Foreign Application Priority Data Jun. 9, 1984 [JP] Japan .................................. 59-118775

[51] Int. Cl.⁴ .............................................. B62D 1/04
[52] U.S. Cl. ...................................... 74/552; 280/750
[58] Field of Search ....................... 280/750 R; 74/552
[56] References Cited

U.S. PATENT DOCUMENTS 3,528,314  9/1970  Barenyi .................................. 74/552
4,123,948  11/1978  Zeller ..................................... 74/552
4,200,309  4/1980  Korn et al. ............................ 74/552

*Primary Examiner*—Larry I. Schwartz
*Attorney, Agent, or Firm*—Cushman, Darby & Cushman

[57] ABSTRACT

In a steering wheel for an automobile having an impact energy absorber mounted on a boss member for absorbing the impact load, the positions of the boss and the boss plate are set lower than the frontal plane of the steering ring by angling a spoke core downwards. An impact energy absorber is mounted on the boss plate. The outer circumference of the impact energy absorber is covered by a cover pad and extension of a cover. Because the wheel pad member does not protrude towards the driver substantially above the frontal plane of the steering ring, the driver's view of the instrument panel is not obscured by it, and it need not detract from the interior styling of the automobile.

4 Claims, 4 Drawing Figures

STEERING WHEEL

BACKGROUND OF THE INVENTION

1. Field of the Invention

The present invention relates to a steering wheel for automobile, where an impact energy absorber to absorb the impact load is installed on a boss member.

2. Description of the Prior Art

In the prior art, various steering wheels with an impact energy absorber mounted on a boss member have been proposed. For example, a wheel pad of such a steering wheel as shown in FIG. 1, comprises an impact energy absorber 31 made of a thin steel plate fashioned into box form and mounted on a boss plate 32. The circumference of the impact energy absorber 31 is covered by a cover pad 33 of soft foamed plastics, and only the bottom side of the boss plate 32 is covered by a cover 34. In this construction, the impact energy absorber 31 is axially plastically deformed in compression in a manner such that its peripheral sidewalls are bowed, e.g. are convex inwards, a condition which will be referred to herein as "partially pre-buckled" so as to absorb the impact load applied thereto from its front. Consequently, the impact energy absorber 31 must be thick and the wheel pad of the steering wheel projects substantially, possibly restricting the driver's view of the instrument panel, and detracting from the appearance qualities of the interior styling of the automobile.

SUMMARY OF THE INVENTION

In order to eliminate above-mentioned disadvantages of the prior art, an object of the invention is to provide a steering wheel having an impact energy absorber mounted on a boss member, wherein a wheel pad member containing the impact energy absorber is not projected towards the driver, so that the instrument panel is not obstructed for the driver. the wheel pad member is not prominent by projection and design of the steering wheel is in balance and a good appearance is presented.

In order to attain the above object, the boss and the boss plate of the steering wheel are set behind the plane of the ring member by angling the spoke core rearwardly of that plane (i.e. towards the front of the automobile), the impact energy absorber is mounted on the boss plate, and the impact energy absorber is covered about its outer periphery by the cover pad and an, extension of the cover.

DESCRIPTION OF THE PREFERRED EMBODIMENTS

Figure 1:
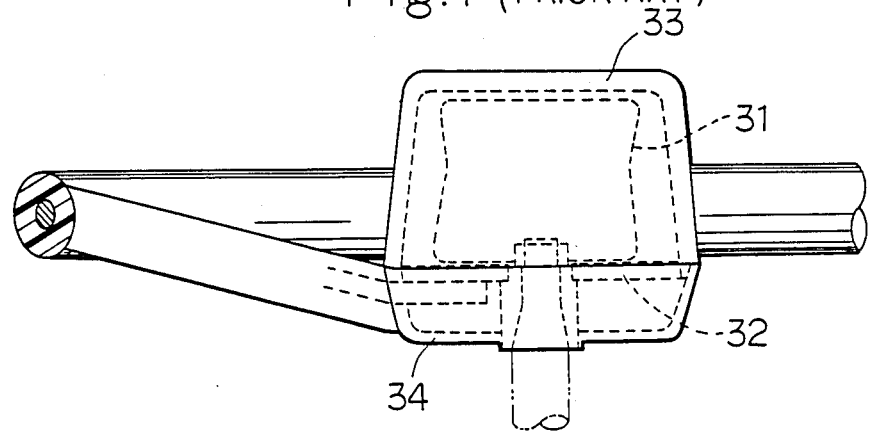
FIG. 1 is a side view of a wheel pad member of a steering wheel in the prior art.
Figure 2:
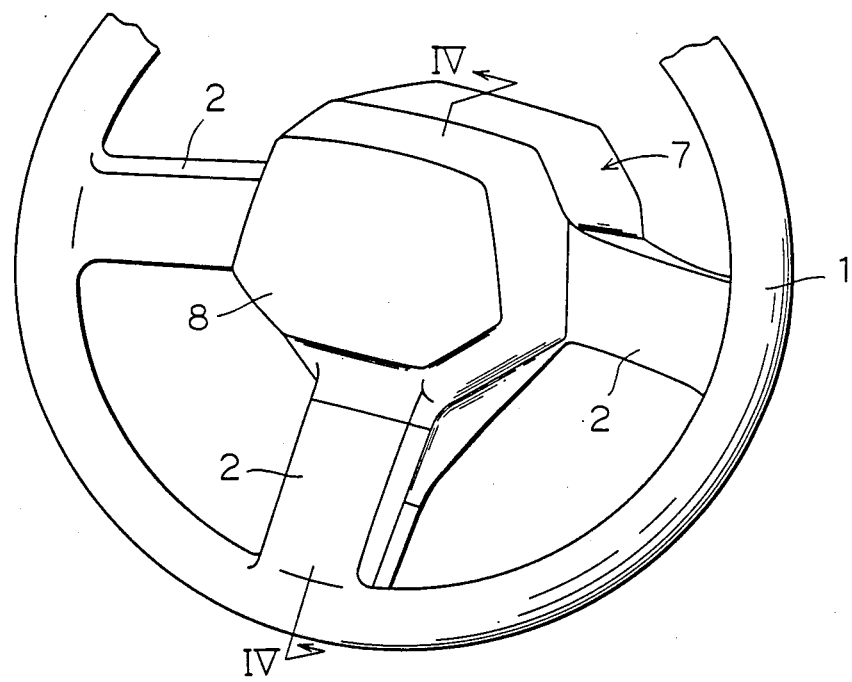
FIG. 2 is a side view of a wheel pad member of a steering wheel of the invention.
Figure 3:
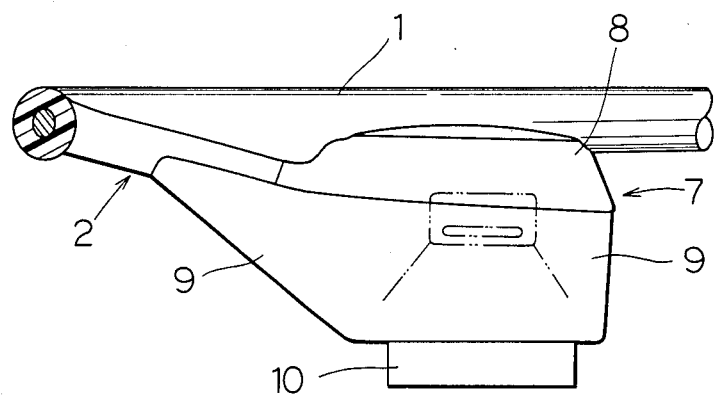
FIG. 3 is a side view of the wheel pad member of FIG. 2.
Figure 4:
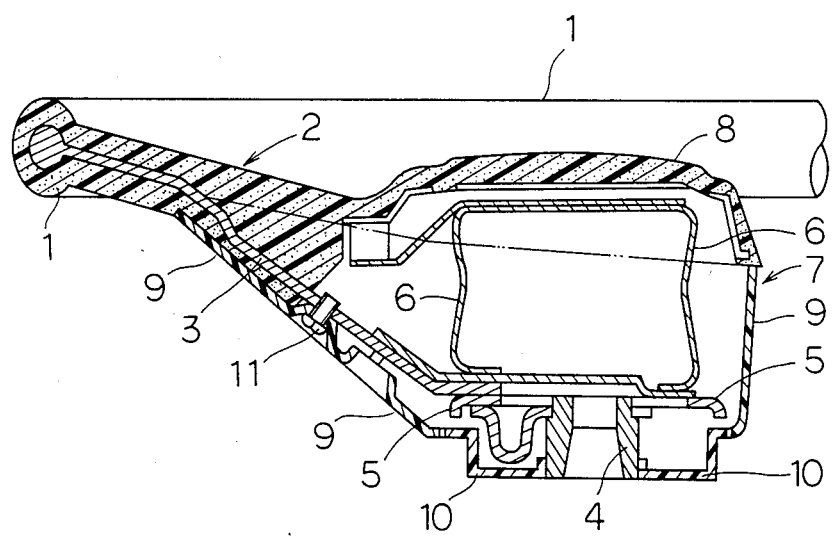
FIG. 4 is a sectional view taken on line IV—IV of FIG. 2.

In the figures, reference numeral 1 designates a ring member, numeral 2 a spoke member, and numeral 3 a metal core for a spoke. The spoke core 3 is bent downwards intermediate the radially outer and radially inner ends thereof and set so that a boss 4 and a boss plate 5 mounted to the radially inner ends of the three spoke cores 3 are disposed below the ring member 1. (For convenience in description, spatial relations will be described in reference to the orientation of the steering wheel as shown in the drawing figures. In a conventional automotive setting the plane of the ring member 1 typically is set at an angle so that the steering wheel faces the driver as the driver faces forwards. Thus the "front" of the steering wheel generally faces the rear of the automobile, and somewhat upwards, whereas the "rear" of the steering wheel generally faces the front of the automobile, and somewhat downwards.) Numeral 6 designates an impact energy absorber which is mounted on the boss plate 5. The impact energy absorber 6 is made of a thin steel plate fabricated into box form and partially prebuckled so as to absorb an impact load. The ring member 1 and the spoke member 2 are molded integrally by soft foamed plastics using the metal core as an insert. On the upper side of a wheel pad member 7, including the impact energy absorber 6 on the boss plate 5, is installed a cover pad 8 of soft foamed plastics so as to cover the wheel pad member 7. A cover is installed on bottom side of the cover pad 8 so as to cover the impact energy absorber 6 and circumference of the boss. Tha cover is divided into a radially outer peripheral cover 9 and a bottom cover 10 at position just below the boss plate 5 and arranged with a small gap to avoid the interference. The outer cover 9 covers the lateral side of the impact energy absorber 6 and bottom side of the spoke member 2 and is secured with a screw 11 to center portion of the spoke core 3.

Since the cover is divided into the outer cover 9 and the bottom cover 10 and the upside cover 9 which surrounds the impact energy absorber 6 is secured not at the boss but at the spoke member 2, when the impact energy absorber 6 is further buckled in use, as it absorbs an impact load, the outer cover 9 is moved about the screw 11 which serves as a fulcrum and therefore the outer cover 9 is not subject to the impact load. Consequently, the impact load does not increase and the impact energy absorber 6 performs its impact load-absorbing action effectively. Since the position of the wheel pad member 7 is lower than that of the ring member 1 and since the outer cover 9 is extended upwards so as to cover the outer circumference of the impact energy absorber 6, the wheel pad member 7 does not project towards the driver above the frontal plane of (i.e. more than does) the steering ring, the instrument panel is not obscured by it for the driver, and the detraction from styling appearance otherwise caused by protrusion of the wheel pad member 7 is avoided. When impact is applied to the ring member 1 from its upper side, the boss plate 5 is deformed and therefore the steering wheel acts to absorb the impact load. In this state, since the cover is divided into the outer cover 9 and the bottom cover 10, both covers are not subject to the deformation of the boss plate 5. The impact load does not increase and the covers 9 and 10 are prevented from breakage or projecting when the steering ring is frontally impacted in a sense to further buckle the impact energy absorber 6.

According to a steering wheel of the invention as above described, the position of the boss and the boss plate is set lower than that of the ring member by angling the spoke core downwards, the circumference of the impact energy absorber mounted on the boss plate is covered by the cover pad and the extension of the cover, so that the wheel pad member containing the impact energy absorber does not project as it does in the prior art, and the instrument panel is not obscured by it for the driver. The wheel pad member does not project substantially. Aesthetic design of the steering wheel is in balance and a good appearance is presented.

Since the cover is divided into the outer cover and the bottom cover and the upside cover is fixed at the spoke member, when the impact energy absorber is buckled by an impact or when the boss plate is deformed at the time when an impact is applied to the ring member, the outer cover is moved so as to avoid the impact load, thereby increase of the impact load, and breakage or projection of the outer cover can be prevented.

What is claimed is:

1. A steering wheel, comprising:
    a central boss having a boss plate means provided thereon;
    a steering ring disposed generally coaxially of said central boss, but axially forwardly thereof, this steering ring including an imaginary frontal plane disposed to be presented towards an automobile driver;
    at least one generally radially extending spoke core member, each such spoke core member being secured at a radially inner end thereof to said boss plate means, and having a radially outer end juxtaposed with and effectively secured to said steering ring;
    each said spoke core member declining from the proximity of said steering ring towards said boss plate firstly at a shallower angle of decline and then, from a site intermediate the radial-extent thereof, at a steeper angle of decline;
    an impact energy absorber provided generally centrally on said boss plate means so as to extend axially forwardly therefrom;
    cover pad means of covering over an axially forward side of said impact energy absorber in such a manner as to partially enclose said impact energy absorber and in such a manner as to present an exterior surface for a corresponding central portion of said steering wheel, this exterior surface being disposed so low that it does not extend forwardly of said frontal plane of said steering ring; and
    cover means enclosing the remainder of said impact energy absorber and extending under said boss plate means into proximity with said boss.

2. The steering wheel of claim 1, wherein:
    said cover means is provided in two adjoining parts including:
        an outer cover extending in circumferentially surrounding relation to said impact energy absorber; and
        a bottom cover extending under said boss plate and into proximity with said boss,
    said outer cover and bottom cover having respective end portions extending into proximity with one another.

3. The steering wheel of claim 2, wherein:
    said outer cover is securred to said at least one spoke member; and
    said bottom cove is secured to said boss.

4. The steering wheel of claim 1, wherein:
    said impact energy absorber is provided in the form of a partially pre-buckled hollow box of plate material secured on said boss plate means.

* * * * *